(12) United States Patent
Koushima et al.

(10) Patent No.: US 8,714,825 B2
(45) Date of Patent: May 6, 2014

(54) PLAIN BEARING AND BEARING DEVICE

(71) Applicant: Daido Metal Company Ltd., Nagoya (JP)

(72) Inventors: Motohiko Koushima, Inuyama (JP); Osamu Ishigo, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 13/764,884

(22) Filed: Feb. 12, 2013

(65) Prior Publication Data

US 2013/0223776 A1    Aug. 29, 2013

(30) Foreign Application Priority Data

Feb. 27, 2012   (JP) .................................. 2012-040033
Oct. 19, 2012   (JP) .................................. 2012-231562

(51) Int. Cl.
*F16C 9/02*  (2006.01)

(52) U.S. Cl.
USPC ........................................................ 384/294

(58) Field of Classification Search
CPC ..................................... F16C 9/02; F16C 9/04
USPC .......................................... 384/288, 294, 397
See application file for complete search history.

(56) References Cited

U.S. PATENT DOCUMENTS

| | | | | |
|---|---|---|---|---|
| 6,082,904 A | * | 7/2000 | Ono et al. | ...... 384/291 |
| 2011/0305410 A1 | * | 12/2011 | Otsuki et al. | ...... 384/397 |
| 2013/0064487 A1 | | 3/2013 | Ishigo | |

FOREIGN PATENT DOCUMENTS

| | | |
|---|---|---|
| EP | 2253859 | 11/2010 |
| JP | 2-102014 | 8/1990 |
| JP | 10-325410 | 8/1998 |
| JP | 2005-069283 | 3/2005 |

OTHER PUBLICATIONS

Search Report dated Jul. 2, 2013 from corresponding patent application in Great Britain, Serial No. GB1303346.9 (one page).

* cited by examiner

*Primary Examiner* — Thomas R Hannon
(74) *Attorney, Agent, or Firm* — Harness, Dickey & Pierce, P.L.C.

(57) ABSTRACT

A plain bearing for supporting a crank shaft of an internal combustion engine is provided. The plain bearing is constituted by a pair of semicylindrical members. A crush relief is formed in an inner circumferential surface of the semicylindrical member, and a main cylindrical surface is formed in a region aside from the crush relief. The crush relief includes an outwardly convex curved surface and an inwardly convex curved surface.

9 Claims, 8 Drawing Sheets

| TEST CONDITIONS | |
|---|---|
| DURATION | 150Hr |
| LOAD | FULL LOAD |
| SHAFT ROTATING SPEED | 6400r.p.m. |
| OPERATION CONDITION | CONTINUOUS OPERATION |

FIG.12

| | LENGTH OF CRUSH RELIEF (mm) | | | DEPTH OF CRUSH RELIEF (mm) | | INWARDLY CONVEX CURVED SURFACE PART AREA RATIO A1/A2 | RESULT |
| --- | --- | --- | --- | --- | --- | --- | --- |
| | L1 | L2 | L | d | d2 | | |
| EXAMPLE 1 | 6 | 5 | 1 | 0.03 | 0.015 | 0.25 | NO DAMAGE |
| EXAMPLE 2 | 6 | 4 | 2 | 0.03 | 0.01 | 0.3 | NO DAMAGE |
| COMPARATIVE EXAMPLE 1 | 6 | - | - | 0.03 | - | - | DAMAGED |

PLAIN BEARING AND BEARING DEVICE

BACKGROUND (1) Field of the Invention

The present invention relates to a plain bearing for supporting a crank shaft of an internal combustion engine and to a bearing device.

(2) Description of Related Art

From the past, a plain bearing constituted by a pair of semicylindrical members has been employed as a main bearing and as a connecting rod bearing. A so-called crush relief is formed in the plain bearing at an inner circumferential surface adjacent to contact surfaces of the semicylindrical members.

A crush relief is a wall-thickness thinner region that is formed in a region adjacent to a circumferential end surface of a semicylindrical member such that a thickness of a wall is thinner toward the circumferential end surface. A crush relief is formed with an intention of absorbing misalignment or deformation of joining surfaces of the semicylindrical members when the pair of semicylindrical members are assembled (see, for example, Japanese Utility Model Laid-Open No. 2-102014).

In recent years, the weight of an internal combustion engine has been reduced in order to improve fuel efficiency, and thus stiffness of a housing member, such as a connecting rod and an engine block, is being reduced. Thus, a bearing holding hole deforms elastically due to a dynamic load from a crank shaft when operating an internal combustion engine. Therefore, a plain bearing follows the deformation of the bearing holding hole, which results in a phenomenon in which a clearance in the horizontal direction of the plain bearing (a space between the inner circumferential surface of the plain bearing and a surface of a mating shaft) increases and decreases repeatedly (a close-in phenomenon). In a case of a connecting rod or an engine block of which stiffness has been reduced, an amount of reduction in the clearance of the plain bearing (in a region near the joining surfaces of the pair of semicylindrical bearings) in the horizontal direction is large when the dynamic load from the crank shaft acts thereon. Then, the inner circumferential surface of the bearing comes into direct contact with the surface of the crank shaft at the circumferential end of the semicylindrical bearing which is at the forward side in a rotation direction of the crank shaft, whereby the bearing is damaged.

As a countermeasure to the above, in the past, as disclosed in JP-A-10-325410, a bearing space between a surface of a crank pin and the inner circumferential surface of the bearing at a circumferential end region of the bearing is increased to prevent a contact between the surface of the crank pin and the inner circumferential surface of the plain bearing caused by the close-in phenomenon, by forming an inner circumferential surface of a plain bearing in an arc shape in which an inner diameter is greater in the horizontal direction than in the vertical direction.

However, in recent years, the size of an oil pump has been reduced in an internal combustion engine, and thus an amount of lubricating oil that is supplied to the inner circumferential surface of a bearing is being decreased. In a case of a bearing in which the bearing space is increased as described in JP-A-10-325410, an amount of lubricating oil that leaks through the space is increased, which leads to a short supply of the lubricating oil to the inner circumferential surface of the bearing. Currently, it is hard to employ such a plain bearing as described in JP-A-10-325410.

It is an object of the present invention to provide a plain bearing that is capable of reducing an amount of lubricating oil that leaks out and preventing damage to the inner circumferential surface of the bearing even when a close-in phenomenon occurs while driving an internal combustion engine.

SUMMARY OF THE INVENTION

In order to accomplish the above-mentioned object, a plain bearing of the present invention is a plain bearing for supporting a crank shaft of an internal combustion engine and includes a pair of semicylindrical members that constitute the plain bearing. Each semicylindrical member includes two crush reliefs, each crush relief arranged in a region adjacent to a circumferential end surface of an inner circumferential surface of the semicylindrical member and gradually reducing in thickness towards the circumferential end surface, and a main cylindrical surface aside from the crush reliefs in the inner circumferential surface of the semicylindrical member. In each semicylindrical member, one crush relief at a forward side in a rotation direction of the crank shaft or two crush reliefs at both sides include a radially outwardly convex curved surface at a side closer to the end surface and a radially inwardly convex curved surface at a side farther from the end surface.

Here, a crank shaft is interpreted as a member that includes a journal part, a crank pin part, and a crank arm part. Further, a plain bearing is interpreted as a bearing including a connecting rod bearing and a main bearing. Furthermore, a semicylindrical member is interpreted as a member that has such a shape that a cylinder is divided into half, which, however, should not be interpreted as being divided strictly into half. Accordingly, either expression of a semicylindrical member or a substantially semicylindrical member can be used.

In the plain bearing of the present invention, the crush relief of the semicylindrical member has an outwardly convex curved surface at a side closer to an end surface and an inwardly convex curved surface at a side farther from the end surface. According to this outwardly convex curved surface, some amount of lubricating oil can be retained in the crush relief. Accordingly, during an operation in which a surface of a mating shaft and the inner circumferential surface of the plain bearing in the horizontal direction approach each other due to the close-in phenomenon, a pressure of the lubricating oil in the crush relief rises due to a hydrodynamic squeezing effect to form a flow of the lubricating oil which is directed toward the inwardly convex curved surface from the outwardly convex curved surface inside the crush relief. Further, according to the inwardly convex curved surface of the crush relief that is at the forward side of the plain bearing of the present invention in the direction in which the crank shaft rotates, the inwardly convex curved surface being formed at a side farther from the end surface of the semicylindrical bearing, the lubricating oil flows between an inwardly convex curved surface part and the surface of the mating shaft in a direction opposite to the direction in which crank shaft rotates toward the inner circumferential surface of the bearing from the crush relief at the moment when the surface of the crush relief approaches the most to the mating shaft due to the close-in phenomenon. A high wedge oil film pressure is generated momentarily on the lubricating oil that flows in a space between the inwardly convex curved surface part and the surface of the crank shaft due to a hydrodynamic wedge effect. A direct contact between the inner circumferential surface of the bearing in the horizontal direction and the mating shaft can be prevented by this wedge oil film pressure of the lubricating oil which momentarily increases, and thus damage to the inner circumferential surface of the bearing can be prevented.

Other purposes, features, and advantages of the present invention will become clear from the following description of the examples in relation to the accompanying drawings.

DETAILED DESCRIPTION OF THE INVENTION

Hereinafter, embodiment of the present invention will be described with reference to the drawings. Note that a crush relief is depicted in exaggeration in the drawings in order to facilitate understanding, and the actual dimensions will be described hereinafter.

EMBODIMENT (Overall Configuration of Bearing Device)

Figure 1:
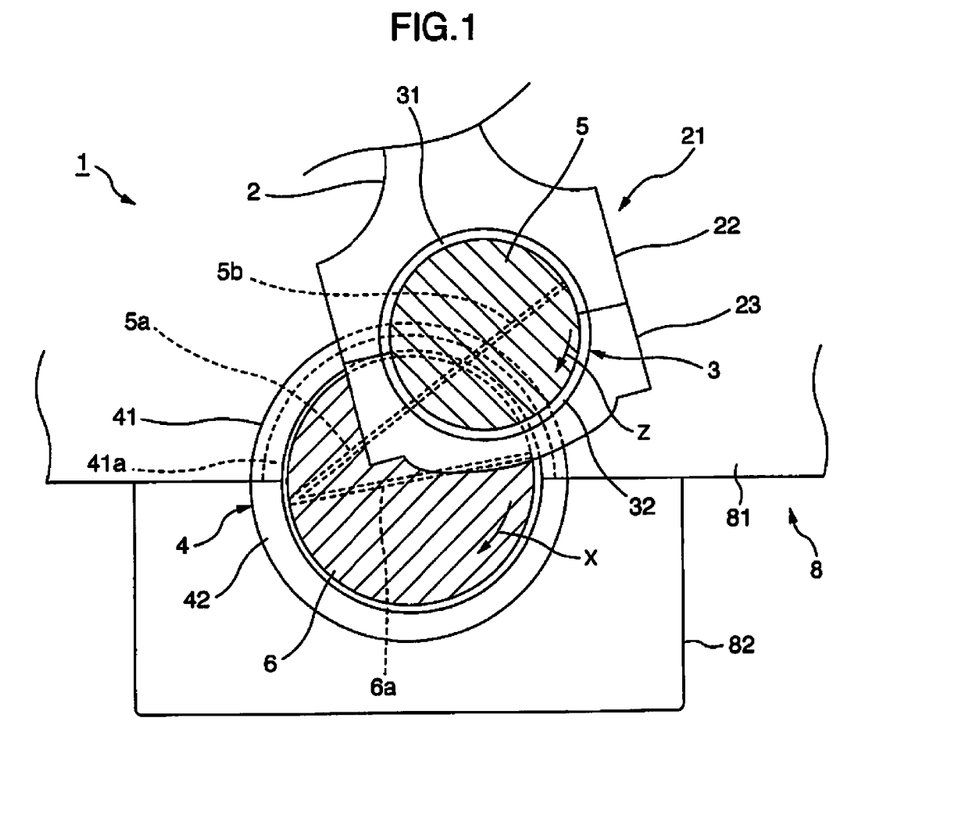
FIG. 1 is a schematic sectional view of a crank shaft of an internal combustion engine, cut at a journal and a crank pin.

FIG. 1 is a schematic view of a crank shaft of an internal combustion engine, cut at a journal and a crank pin, respectively. A bearing device 1 of the present embodiment includes a journal 6 that is supported by a lower part of a cylinder block 8, a crank pin 5 that is formed integrally with the journal 6 to rotate about the journal 6, and a connecting rod 2 that conveys a reciprocating motion from the internal combustion engine to the crank pin 5. The bearing device 1 of the present embodiment further includes a main bearing 4 that rotatably supports the journal 6 and a connecting rod bearing 3 that rotatably supports the crank pin 5, as a plain bearing for supporting the crank shaft.

Note that although the crank shaft includes a plurality of journal parts 6 and a plurality of crank pin parts 5, here, for convenience of the description, a single journal part 6 and a single crank pin part 5 are shown for description. In FIG. 1, to describe a position relationship in a depthwise direction of the paper plane, the journal 6 is in the back side, and the crank pin 5 is in the forward side.

The journal 6 is axially supported by a cylinder block lower part 81 of the internal combustion engine through a pair of semicylindrical members 41 and 42. The pair of semicylindrical members 41 and 42 are assembled into the generally cylindrical main bearing 4 with respective end surfaces thereof being joined to each other.

A lubricating oil groove 41a is formed in the semicylindrical member 41 that is located at an upper side in the drawing along an entire length of the inner circumferential surface thereof. The journal 6 includes a through-hole 6a that penetrates in a diametrical direction, and when the journal 6 rotates in a direction shown by an arrow X, openings at both ends of the through-hole 6a alternately communicate with the lubricating oil groove 41a.

The crank pin 5 is axially supported by a large-end housing 21 of the connecting rod 2 (a rod-side large-end housing 22 and a cap-side large-end housing 23) through a pair of semicylindrical members 31 and 32. The semicylindrical members 31 and 32 are assembled into the generally cylindrical connecting rod bearing 3 with respective end surfaces thereof being joined to each other.

As stated above, lubricating oil discharged by an oil pump to the main bearing 4 is fed into the lubricating oil groove 41a that is formed along the inner circumferential surface of the main bearing 4 through a through-hole formed in a wall of the main bearing 4 from an oil gallery that is formed in a cylinder block wall.

Further, a first lubricating oil channel 6a is formed in the diametrical direction of the journal 6, and openings at both ends of the first lubricating oil channel 6a are in communication with the lubricating oil groove 41a. Furthermore, a second lubricating oil channel 5a that passes through a crank arm (not shown) is formed to branch off from the first lubricating oil channel 6a in the journal 6, and this second lubricating oil channel 5a is in communication with a third lubricating oil channel 5b that is formed to penetrate the crank pin 5 in the diametrical direction.

In this way, the lubricating oil passes through the first lubricating oil channel 6a, the second lubricating oil channel 5a, and the third lubricating oil channel 5b to be supplied to sliding surfaces between the crank pin 5 and the connecting rod bearing 3 through an end outlet of the third lubricating oil channel 5b (that is, an outlet that opens in an outer circumferential surface of the crank pin 5).

Hereinafter, although the description will be given with the connecting rod bearing 3 taken as an example for the plain bearing of the present invention, the main bearing 4 also has substantially the same configurations and effects.

(Configuration of Plain Bearing)

Subsequently, an overall shape of the connecting rod bearing 3 that serves as the plain bearing of the present embodiment will be described with reference to FIG. 2.

Figure 2:
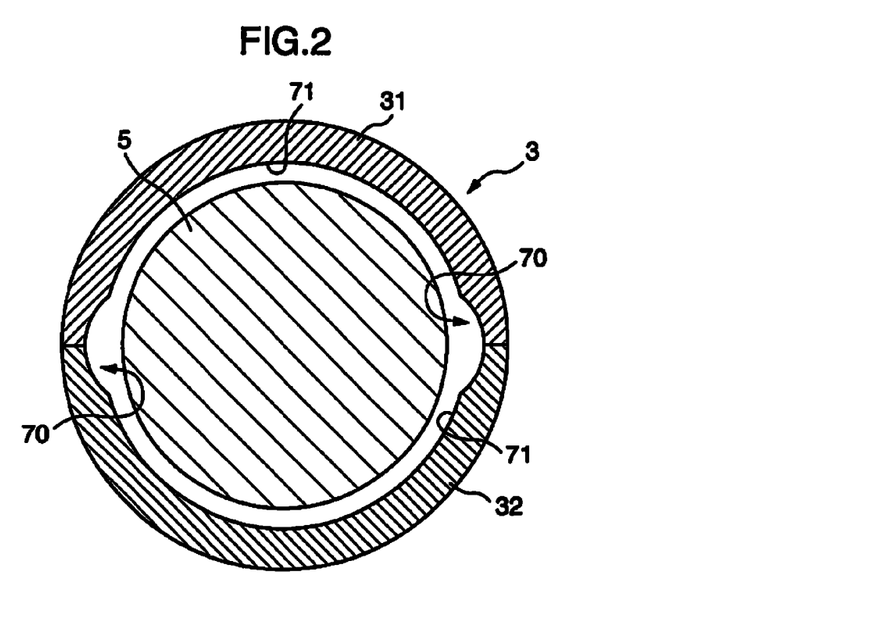
FIG. 2 is a front view of a connecting rod bearing of an example.

As shown in FIG. 2, the connecting rod bearing 3 is formed into a generally cylindrical shape by assembling the pair of semicylindrical members 31 and 32 such that the end surfaces thereof are joined to each other. The inner circumferential surfaces of the respective semicylindrical members 31 (32)

have a main cylindrical surface 71 located toward the center in the circumferential direction and crush reliefs 70, 70 located at both circumferential ends.

The crush relief 70 is a wall-thickness thinner region that is formed in a region adjacent to a circumferential end surface 72 in the inner circumferential surface of the semicylindrical member 31 (see FIG. 3) such that a thickness of a wall is thinner toward the end surface 72. The crush relief 70 is provided with an intention of absorbing misalignment or deformation of joining surfaces when the pair of semicylindrical members 31 and 32 are assembled to the connecting rod 2.

Note that the improved crush relief 70 of the present invention to be described hereinafter may be formed, of the crush reliefs 70, . . . of the pair of semicylindrical members 31 and 32, only in one of the semicylindrical members 31 (32) or in both semicylindrical members 31 and 32. Further, in one semicylindrical member 31 (32), the crush relief 70 of the present invention may be formed only at one end or may be formed at both ends. It is preferable that at least the crush relief at the forward side in the rotation direction of the crank shaft is the crush relief of the present invention.

The main cylindrical surface 71 is a semicylindrical surface that occupies a major part of the inner circumferential surface and constitutes a primary sliding surface. The main cylindrical surface 71 is a region aside from the crush relief 70 in the inner circumferential surface of the semicylindrical member 31.

(Configuration of Crush Relief)

The shape of the crush relief 70 of the present embodiment will be described in detail with reference to FIGS. 3 to 5. Note that the shape of the crush relief 70 of the present embodiment is an application example to a plain bearing for a crank shaft of an internal combustion engine of a typical automobile (where an inner diameter (a diameter of the crank shaft) of the plain bearing is approximately 30 mm to 100 mm). However, the present embodiment is not limited thereto. In the drawings, a line where the main cylindrical surface 71 is extended over a region of the crush relief 70 is defined as an imaginary main cylindrical plane 71a.

Figure 3:
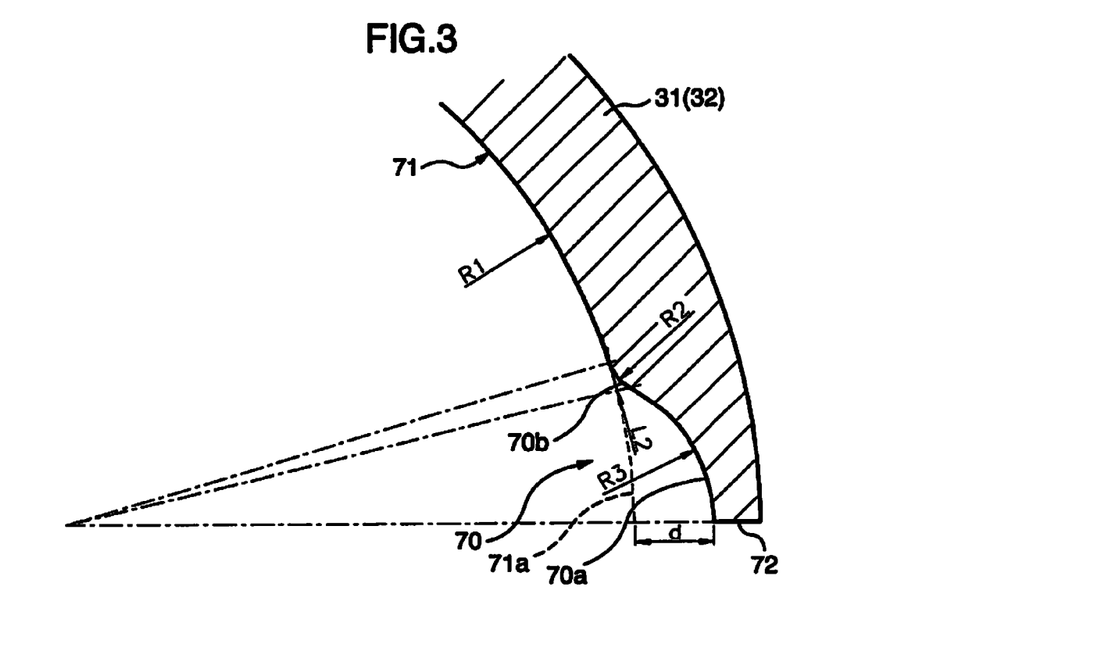
FIG. 3 is an enlarged sectional view showing a configuration of a crush relief of the connecting rod bearing of FIG. 2.
Figure 4:
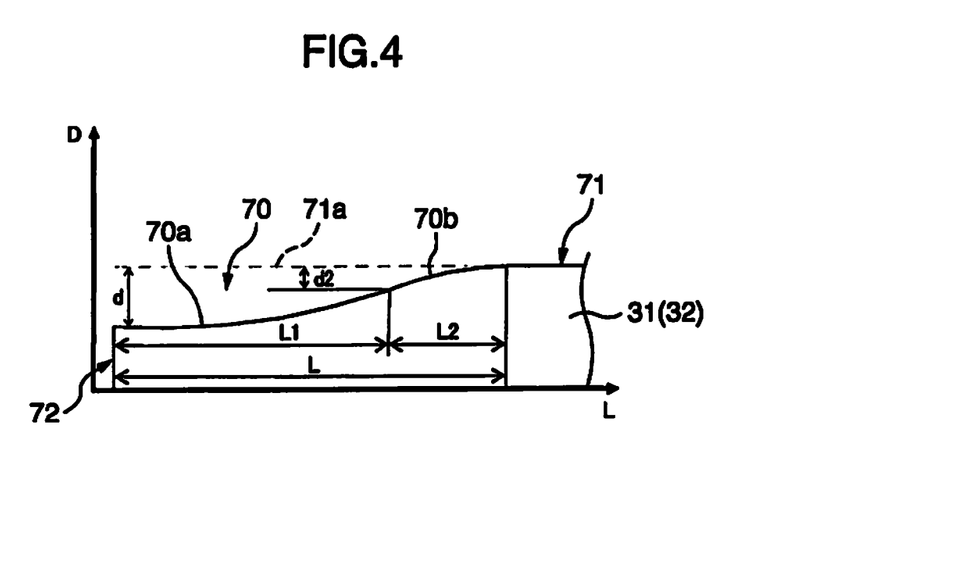
FIG. 4 is a descriptive view for describing a length and a depth of the crush relief of the connecting rod bearing of FIG. 2.
Figure 5:
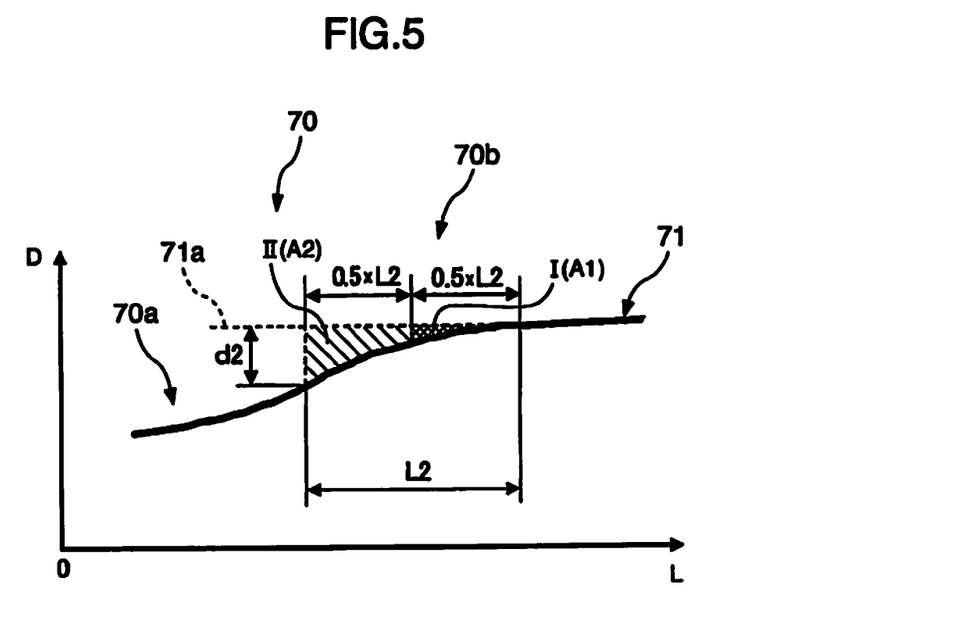
FIG. 5 is a descriptive view for describing a shape of an inwardly convex curved surface of the crush relief of the connecting rod bearing of FIG. 2.

As shown in FIGS. 3 to 5, the crush relief 70 of the present embodiment includes an outwardly convex curved surface 70a that outwardly projects in a radial direction at a side closer to the circumferential end surface 72 and an inwardly convex curved surface 70b that inwardly projects in the radial direction at a side farther from the end surface 72 to generally form a gentle S-shaped curved surface. In other words, a point of inflection at which the sign of curvature changes is present midway along the curved surface of the crush relief 70.

The outwardly convex curved surface 70a is a curved surface that occupies a major part of the crush relief 70 and is formed into a cylindrical shape having a radius R3 of which the center is located inwardly in the radial direction of the main cylindrical surface 71 (the imaginary main cylindrical plane 71a). A length L1 of the outwardly convex curved surface 70a in the circumferential direction is preferably equal to or greater than 2 mm when an overall length L of the crush relief 70 in the circumferential direction is 3 mm to 7 mm (see FIG. 4). Note that a section of the outwardly convex curved surface 70a is not limited to a cylindrical shape as long as it outwardly projects, and any given curved surface can be applied. For example, the outwardly convex curved surface 70a may be a curved surface along which a radius of curvature changes midway.

The inwardly convex curved surface 70b is a curved surface near a rising point of the crush relief 70 and is formed into a cylindrical shape having a radius R2 of which the center is located outwardly in the radial direction of the main cylindrical surface 71 (the imaginary main cylindrical plane 71a). The inwardly convex curved surface 70b is formed to gradually approach the main cylindrical surface 71 to smoothly connect the two cylindrical surfaces of the outwardly convex curved surface 70a and the main cylindrical surface 71. Note that a section of the inwardly convex curved surface 70b does not need to be a cylindrical shape, and any given curved surface can be applied. For example, the inwardly convex curved surface 70b may be a curved surface along which a radius of curvature changes midway.

A length L2 of the inwardly convex curved surface 70b in the circumferential direction is preferably equal to or greater than 1 mm when the overall length L of the crush relief 70 in the circumferential direction is 3 mm to 7 mm. Further, a depth d2 of the inwardly convex curved surface 70b in the radial direction (a distance from the imaginary main cylindrical plane 71a to the point of inflection) is preferably 5 μm to 15 μm when an overall depth d of the crush relief 70 in the radial direction is 10 μm to 50 μm (see FIG. 4).

Furthermore, the inwardly convex curved surface 70b of the present embodiment is preferably in a shape described below, as shown in FIG. 5. That is, when the connecting rod bearing 3 is two-dimensionally developed (linearly developed within a section), a section of a region between the inwardly convex curved surface 70b and the imaginary main cylindrical plane 71a in which the main cylindrical surface 71 is extended over the crush relief 70 is assumed. This section is divided into two regions by a straight line that passes through the middle point along the length L2 of the inwardly convex curved surface 70b in the circumferential direction to define a first region that is farther from the end surface 72 and a second region that is closer to the end surface 72. Then, a sectional area of the first region is designated as A1, and a sectional area of the second region is designated as A2. Under such an assumption, the inwardly convex curved surface 70b is formed so as to satisfy an expression below.

$$A1/A2 < 0.3$$

The above expression indicates that the space (the area of the section) rapidly decreases from the second region to the first region. If the inwardly convex curved surface 70b is a planar surface instead of being a curved surface, it turns out that $A1/A2 = 1/3$ (0.33), which reveals that the change in the space is more rapid as compared to the case of the planar surface.

(Shape Identification Method)

The shape of the crush relief 70 described above can be measured with a typical shape measuring instrument such as a roundness measuring instrument. First, when a bearing is assembled in a connecting rod, an engine block, or a housing similar to these, the inner surface of the bearing is measured continuously in the circumferential direction. FIG. 4 shows, based on the obtained measurement result, a sectional view of the shape of the semicylindrical member at the vicinity of the circumferential end thereof when the inner circumferential surface (main cylindrical surface) of the bearing is two-dimensionally developed, as viewed in a direction along an axial direction of the bearing.

(Operation)

The operation of the connecting rod bearing 3 that serves as the plain bearing of the present embodiment will be described with reference to FIGS. 6A to 8.

First, the "close-in phenomenon" will be described. As mentioned above, when stiffness of the housing member is low, the bearing holding hole (housing) elastically deforms due to a dynamic load from the crank shaft. Accordingly, the plain bearing follows the deformation of the bearing holding hole, which results in a phenomenon in which a clearance of the plain bearing in the horizontal direction (a space between the inner circumferential surface of the plain bearing and the surface of the mating shaft) increases and decreases repeatedly (the close-in phenomenon).

Figure 6A:
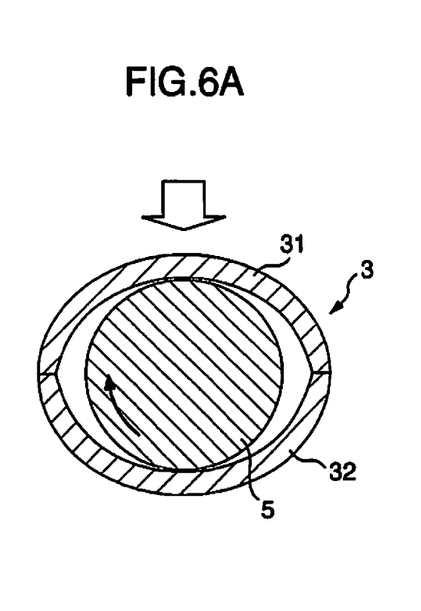
FIG. 6A is a descriptive view showing deformation of a plain bearing on which a load acts, when a downward load acts.

In particular, as shown in FIG. 6A, when a downward load is added to the bearing holding hole of the bearing housing from the crank shaft, the bearing 3 spreads in the horizontal direction. In this state, a width in the horizontal direction is increased.

Figure 6B:
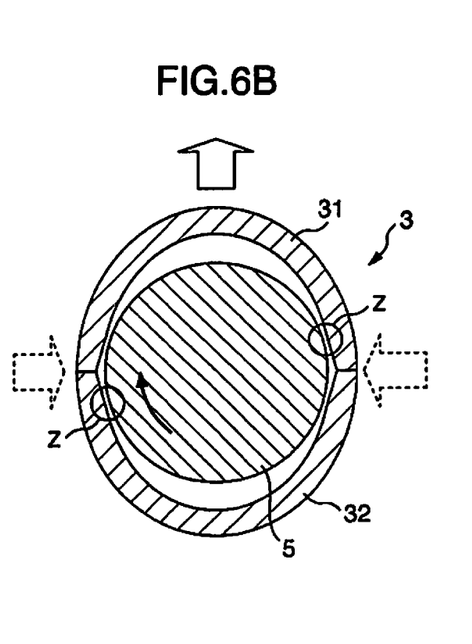
FIG. 6B is a descriptive view showing deformation of a plain bearing on which a load acts, when an upward load acts.

On the other hand, as shown in FIG. 6B, when an upward load is added to the bearing holding hole of the bearing housing from the crank shaft, the bearing 3 spreads in the vertical direction. In this state, a width in the horizontal direction is decreased.

Subsequently, the operation of the crush relief 70 of the present embodiment will be described with reference to FIGS. 7A to 8.

Here, an operation of a plain bearing in which an existing crush relief is formed will be described. The operation will be described respectively of a crush relief at a rear side of a semicylindrical member in a direction in which the crank shaft rotates and a crush relief in a forward side of the semicylindrical member in a direction in which the cranks shaft rotates.

In the crush relief at the rear side of the semicylindrical member in the rotation direction of the crank shaft, a wedge shaped space that becomes narrower in the direction in which the crank shaft rotates is formed between the surface of the crush relief and the surface (the outer circumferential surface) of the crank shaft. Accordingly, a pressure of the lubricating oil that flows through the wedge shaped space in the direction in which the crank shaft rotates rises due to the hydrodynamic wedge effect. As being subjected to the oil film pressure of the lubricating oil in this way, the main cylindrical surface near a portion adjacent to the crush relief at the rear side of the semicylindrical member in the direction in which the crank shaft rotates is less likely to come into direction contact with the surface of the crank shaft.

On the other hand, in the crush relief at the forward side of the semicylindrical member in the rotation direction of the crank shaft, a wedge shaped space that becomes wider in the direction in which the shaft rotates (hereinafter, referred to as an inverted wedge shape) is formed between the surface of the crush relief and the surface (the outer circumferential surface) of the crank shaft. Accordingly, an oil flow of the lubricating oil that is directed toward the main cylindrical surface adjacent to the crush relief through the crush relief due to the aforementioned hydrodynamic squeezing effect is prevented from flowing into the main cylindrical surface side by an oil flow of the lubricating oil that follows along the surface of the rotating crank shaft to flow into the space in the crush relief from the space between the main cylindrical surface and the surface (the outer circumferential surface) of the crank shaft. A pressure of this lubricating oil that flows through the inverted wedge shaped space in the same direction as the direction in which the crank shaft rotates does not rise since the hydrodynamic wedge effect does not occur thereto. Accordingly, the main cylindrical surface near a portion adjacent to the crush relief at the forward side of the semicylindrical member in the rotation direction of the crank shaft comes into direct contact with the surface (the outer circumferential surface) of the crank shaft, which is likely to cause damage thereto. Hereinafter, the operation of the plain bearing of the present invention will be described for the crush relief at the forward side of the semicylindrical member in the rotation direction of the crank shaft.

(1) First, referring to FIG. 7A, a state where the crush relief 70 and the surface 51 of the shaft are distanced relatively from each other will be described. The crush relief 70 of the present embodiment includes the outwardly convex curved surface 70*a* at a side closer to the circumferential end. Accordingly, a volume of a space formed between the crush relief 70 and the surface 51 of the shaft is large, and thus a large amount of lubricating oil is retained in the space in this state.

(2) Next, referring to FIG. 7B, a state where the crush relief 70 and the surface 51 of the shaft approach each other relatively will be described. In this state, a pressure of the lubricating oil in the space rises due to the hydrodynamic squeezing effect, and oil flows that are directed toward the main cylindrical surfaces 71 (shown by arrows) are formed inside the respective crush reliefs 70 of the pair of semicylindrical members 31 and 32.

(3) Lastly, referring to FIG. 7C, a state where the crush relief 70 and the surface 51 of the shaft have relatively approached each other the most will be described. In this state, an inverted wedge shaped space is formed between the inwardly convex curved surface 70*b* of the crush relief 70 at the forward side of the semicylindrical member 32 in the direction in which the crank shaft rotates and the surface 51 of the shaft such that a distance between the two surfaces is reduced rapidly toward the main cylindrical surface 71 in the direction opposite to the direction in which the crank shaft rotates. Then, as shown in FIG. 8, a flow of the lubricating oil that is directed toward the main cylindrical surface 71 in the direction opposite to the rotation direction of the crank shaft is formed momentarily in the inverted wedge shaped space between the inwardly convex curved surface 70*b* of the crush relief 70 and the surface 51 of the shaft, and a high wedge oil film pressure P is generated momentarily at the position of the inwardly convex curved surface 70*b*. This wedge oil film pressure P prevents a contact between the surface 51 of the shaft and the main cylindrical surface 71 that is adjacent to the crush relief 70 at the forward side of the semicylindrical member 32 in the direction in which the crank shaft rotates.

(Effects)

The effects of the connecting rod bearing 3 that serves as the plain bearing of the present embodiment and of the bearing device 1 will be listed and described.

(1) The connecting rod bearing 3 that serves as the plain bearing of the present embodiment is the connecting rod bearing 3 that supports the crank pin 5 of the internal combustion engine and includes the pair of semicylindrical members 31 and 32 that constitute the connecting rod bearing 3, the crush relief 70 that is formed in a region adjacent to the circumferential end surface 72 of the inner circumferential surface of the semicylindrical members 31 and 32 such that a thickness of the wall is thinner toward the end surface 72, and the main cylindrical surface 71 that is a region aside from the crush relief 70 in the inner circumferential surface of the semicylindrical members 31 and 32. The crush relief 70 of at least one of the semicylindrical members 31 (32) includes the outwardly convex curved surface 70*a* that outwardly projects in the radial direction at a side closer to the end surface 72 and the inwardly convex curved surface 70*b* that inwardly projects in the radial direction at a side farther from the end surface 72.

In this way, according to the crush relief 70 of the present embodiment which includes both the outwardly convex curved surface 70*a* and the inwardly convex curved surface 70*b*, a direct contact between the inner circumferential surface of the circumferential end side at the forward side of the semicylindrical members 31 and 32 in the direction in which the crank shaft rotates and the mating shaft can be prevented by the wedge oil film pressure P of the lubricating oil, and thus damage to the inner circumferential surface of the bearing can be prevented. In other words, first, some amount of lubricating oil can be retained in a space defined by the crush relief 70 and the surface 51 of the shaft by the outwardly convex curved surface 70a. Therefore, when the surface 51 of the mating shaft and the inner circumferential surface of the plain bearing in the horizontal direction (the position of the crush relief 70) approach each other due to the close-in phenomenon, a pressure of the lubricating oil in the crush relief 70 rises due to the hydrodynamic squeezing effect to form a flow of the lubricating oil that is directed toward the inwardly convex curved surface 70b from the outwardly convex curved surface 70a through the crush relief 70. Then, at the moment when the surface of the crush relief 70 and surface 51 of the mating shaft approach each other the most due to the close-in phenomenon, a flow of the lubricating oil in the direction opposite to the direction in which the crank shaft rotates is formed by the inwardly convex curved surface 70b between the inwardly convex curved surface 70b and the surface 51 of the mating shaft in the crush relief 70 at the forward side of the semicylindrical members 31 and 32 in the direction in which the crank shaft rotates. When the lubricating oil passes through the space that rapidly becomes narrower between the inwardly convex curved surface 70b and the surface 51 of the mating shaft, the high wedge oil film pressure P is momentarily generated due to the hydrodynamic wedge effect. Accordingly, a direct contact between the surface 51 of the mating shaft and the main cylindrical surface 71 near the circumferential end at the forward side of the semicylindrical members 31 and 32 in the direction in which the crank shaft rotates can be prevented.

Figure 7A:
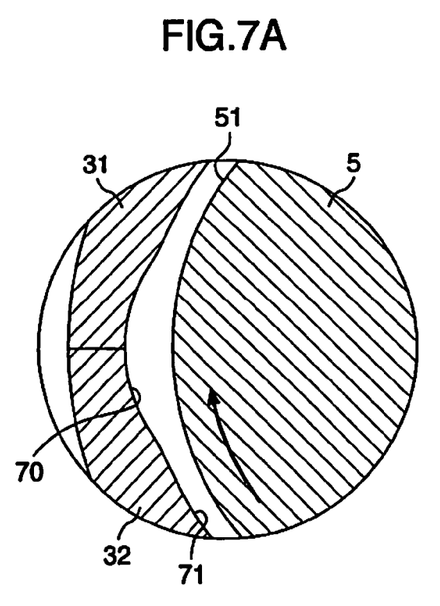
FIG. 7A is a descriptive view for describing a relationship between a space and a flow of lubricating oil, when the space is wide.
Figure 7B:
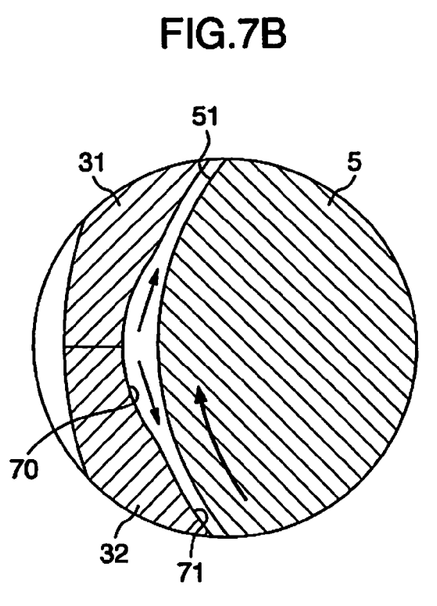
FIG. 7B is a descriptive view for describing a relationship between a space and a flow of lubricating oil, when the space becomes narrower.
Figure 7C:
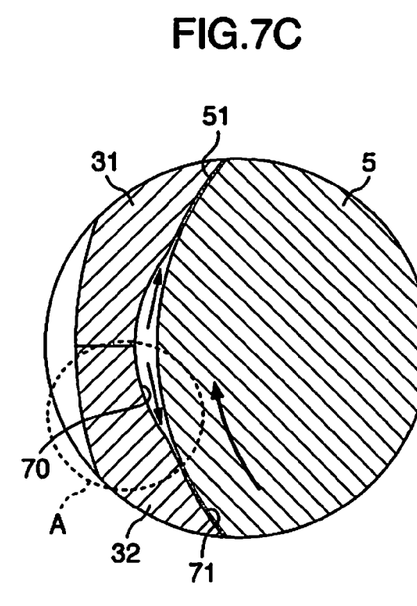
FIG. 7C is a descriptive view for describing a relationship between a space and a flow of lubricating oil, when the space is narrowest.
Figure 8:
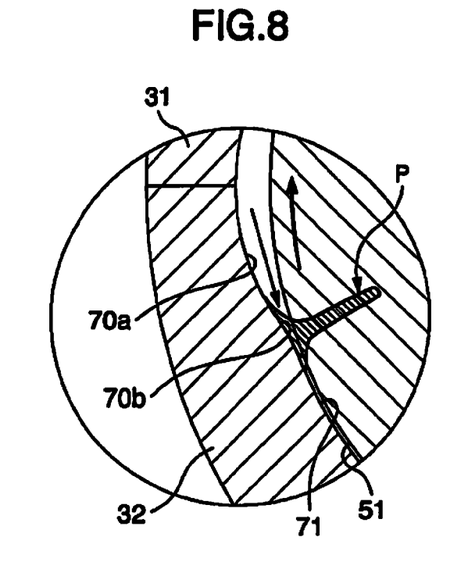
FIG. 8 is an operational view for describing a wedge oil film pressure P by enlarging an A-section of FIG. 7C.
Figure 9:
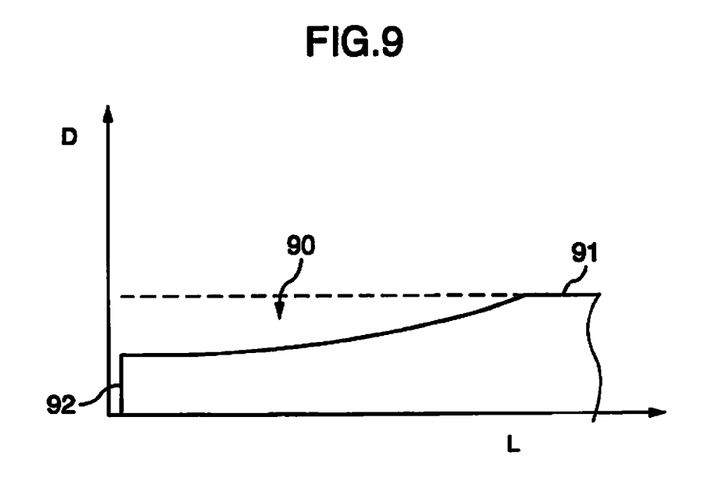
FIG. 9 is a descriptive view for describing a shape of a crush relief of Comparative Example 1.
Figure 10:
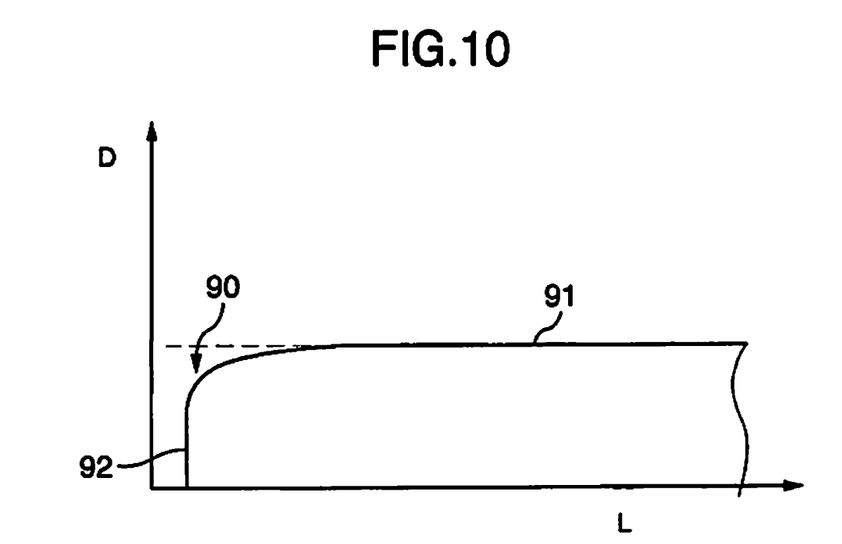
FIG. 10 is a descriptive view for describing a shape of a crush relief of Comparative Example 2.

For example, as shown in Comparative Example 1 of FIG. 9, when a crush relief 90 is configured only by an outwardly convex curved surface, although a large amount of lubricating oil can be retained in a state shown in FIG. 7A, since a main cylindrical surface 91 is also formed of an outwardly convex curved surface, a space gently becomes narrower in the direction of the oil flow in a state shown in FIG. 7C. Accordingly, when the surface of the crush relief and the surface of the mating shaft start to approach each other, a flow of the lubricating oil that is directed toward the inner circumferential surface (the main cylindrical surface) through the space between the surface of the crush relief at the forward side in the direction in which the crank shaft rotates and the surface of the mating shaft due to the squeezing effect is disturbed by an oil flow of the lubricating oil that flows into the space between the surface of the crush relief and the surface of the mating shaft following along the surface of the shaft in the space between the main cylindrical surface 91 of the semicylindrical member and the surface of the mating shaft, and thus the lubricating oil does not flow toward the main cylindrical surface. Therefore, the wedge oil film pressure is not generated in the lubricating oil. Accordingly, a contact between the surface of the shaft and the main cylindrical surface cannot be prevented. Meanwhile, as shown in Comparative Example 2 of FIG. 10, when the crush relief 90 is configured only by an inwardly convex curved surface, only a small amount of lubricating oil can be retained in a state shown in FIG. 7A, and thus the formation of an oil flow that is directed toward the main cylindrical surface 91 becomes insufficient in a state shown in FIG. 7C. Accordingly, a contact between the surface of the shaft and the main cylindrical surface cannot be prevented.

(2) The inwardly convex curved surface 70b is formed to gradually approach the main cylindrical surface 71, and thus a space that rapidly becomes narrower between the surface of the crush relief and the surface of the shaft is formed at the circumferential end of the crush relief 70. Therefore, in the crush relief 70 at the forward side of the semicylindrical members 31 and 32 in the rotation direction of the crank shaft, an oil flow that is directed toward the main cylindrical surface 71 due to the squeezing effect is compressed strongly in this space that rapidly becomes narrower to flow into the side of the main cylindrical surface 71, and the wedge oil film pressure is generated in the lubricating oil that flows in this space.

(3) The outwardly convex curved surface 70a can be formed into a cylindrical shape of which the center is located inwardly in the radial direction of the semicylindrical member 31 (32).

(4) The connecting rod bearing 3 of the present embodiment is formed such that when the connecting rod bearing 3 that serves as the plain bearing is two-dimensionally developed, when a section of a region between the inwardly convex curved surface 70b and the imaginary main cylindrical plane 71a in which the main cylindrical surface 71 is extended over the region of the crush relief 70 is divided at the middle line in the circumferential direction of the inwardly convex curved surface 70b to designate a sectional area of the first region that is farther from the end surface as A1 and a sectional area of the second region that is closer to the end surface as A2, a relational expression "A1/A2<0.3" is satisfied. In this way, if the rate of change in the sectional area is increased at a connecting position of the crush relief 70 and the main cylindrical surface 71, the lubricating oil is more likely to flow toward the main cylindrical surface 71, and the wedge oil film pressure can be further increased.

(5) The overall length of the crush relief 70 in the circumferential direction is preferably 3 mm to 7 mm, and the length L2 of the inwardly convex curved surface 70b in the circumferential direction is preferably equal to or greater than 1 mm.

(6) The overall length of the crush relief 70 in the circumferential direction is preferably 3 mm to 7 mm, and the depth d2 of the inwardly convex curved surface 70b in the radial direction is preferably 5 μm to 15 μm.

(7) As shown in the embodiment, the plain bearing of the present invention can be applied to the connecting rod bearing 3 for supporting the crank pin 5 of the crank shaft.

(8) Similarly, the plain bearing of the present invention can be applied to the main bearing 4 for supporting the journal 6 of the crank shaft.

(9) The bearing device 1 of the present invention includes the plain bearing as described above, a housing that holds the plain bearing, and the crank shaft that is supported by the plain bearing. In particular, as shown in the embodiment, the bearing device 1 includes the connecting rod bearing 3 that serves as the plain bearing, the large-end housing 21 of the connecting rod 2 that serves as the housing, and the crank pin 5 that serves as the crank shaft. According to this bearing device 1, even when being repeatedly subjected to the close-in phenomenon, damage to the inner circumferential surface of the bearing can be prevented. The bearing device 1 can also be constituted by the main bearing 4 that serves as the plain bearing that has the crush relief as described above, the cylinder block lower part 81 and a cap member 82 that serve as the housing, and the journal 6 that serves as the crank shaft.

Further, the housing is configured of a pair of housing members, and the crush relief 70 that includes the outwardly convex curved surface 70a and the inwardly convex curved surface 70b can be formed only in one of the semicylindrical members, the one corresponding to one of the pair of the housing members having lower stiffness. For example, when the connecting rod 2 is considered as the housing, the outwardly convex curved surface 70a and the inwardly convex curved surface 70b can be formed only in the crush relief 70 of the lower side semicylindrical member 32 corresponding to the cap-side large-end housing member 23 having lower stiffness.

(Confirmation Test)

A confirmation test for confirming the effects of the plain bearing of the present invention will be described with reference to FIGS. 11 and 12.

(Test Conditions)

Figure 11:
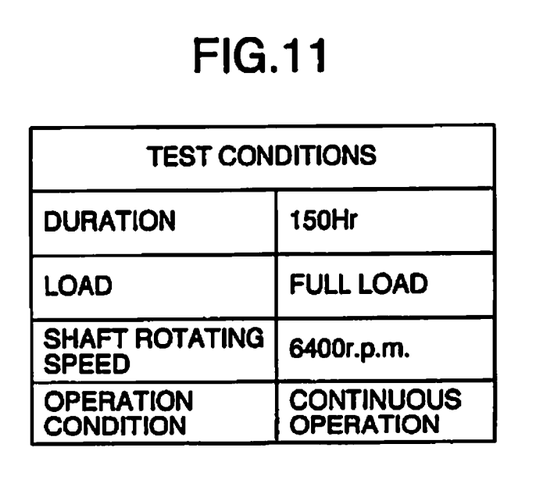
FIG. 11 is a table showing test conditions of a confirmation test.

FIG. 11 shows the test conditions. The operation conditions in Examples 1 and 2 and Comparative Example 1 were continuous operation. The shaft rotating speed was 6400 rpm, the load was full load, and the test duration was 150 hours.

Figure 12:
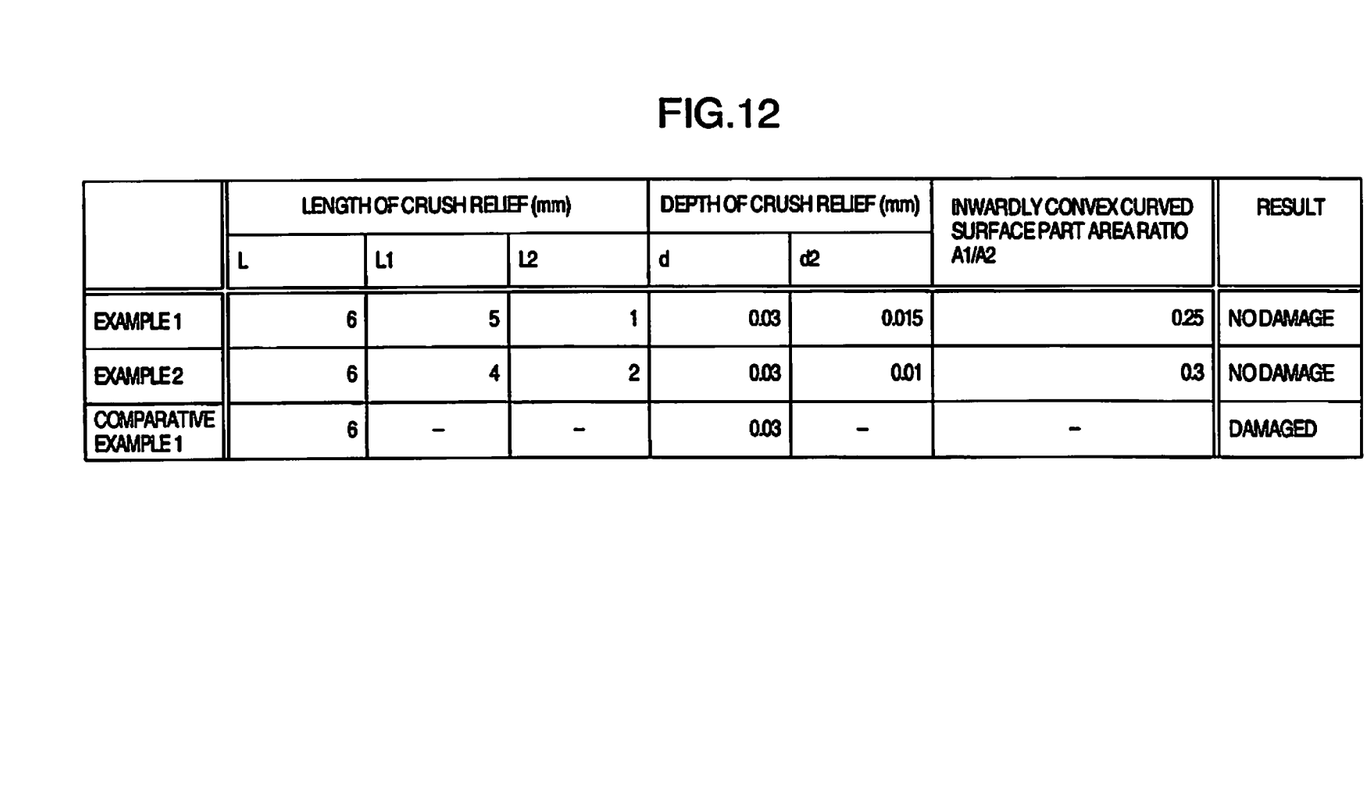
FIG. 12 is a table showing test conditions and results of the confirmation test.

The specifications of the crush reliefs of the semicylindrical members of Examples 1 and 2 and Comparative Example 1 on which the test was carried out are shown in the left column of FIG. 12. In FIG. 12, the reference numerals of respective parts showing the specifications of the crush reliefs correspond to the reference numerals in FIGS. 3, 4, and 5. The plain bearings of Examples 1 and 2 and Comparative Example 1 were each formed by pressing a multi-layered material formed of a steel back and an Al-based bearing alloy to produce such a semicylindrical member where the steel back constitutes the outer circumferential surface and which has the outer diameter of 48 mm, the inner diameter of 45 mm and the width of 21 mm and thereafter by cutting the semicylindrical member such that the crush relief meets the specifications shown in FIG. 12.

The crush reliefs of the semicylindrical members of Example 1 and Example 2 each includes the outwardly convex curved surface 70a that outwardly projects in the radial direction at a side closer to the circumferential end surface 72 and the inwardly convex curved surface 70b that inwardly projects in the radial direction at a side farther from the end surface 72 to generally form a gentle S-shaped curved surface, as shown in FIGS. 3 to 5. In other words, a point of inflection at which the sign of curvature changes is present midway along the curved surface of the crush relief 70.

The rate of change in the sectional area toward the main cylindrical surface is varied in Example 1 and Example 2. That is, when a section of a region between the inwardly convex curved surface and the imaginary main cylindrical plane in which the main cylindrical surface is extended over the region of the crush relief is divided by a line segment that passes through the middle point of the length of the inwardly convex curved surface in the circumferential direction to designate a sectional area of the first region that is farther from the end surface as A1 and a sectional area of the second region that is closer to the end surface as A2, the ratio of the sectional area A1 of the first region to the sectional area A2 of the second region was made to differ from each other (see FIG. 5). In particular, as for the space between the inwardly convex curved surface and the imaginary main cylindrical plane, the rate of change in the sectional area toward the main cylindrical surface was made greater in Example 1 than in Example 2.

The crush relief of the semicylindrical member of Comparative Example 1 was an existing crush relief that was configured only by an outwardly convex curved surface (see FIG. 9).

The confirmation test was carried out in a state where two of the semicylindrical members of the respective Examples 1 and 2 and Comparative example 1 described above were paired, and each pair was arranged in the connecting rod and the connecting rod cap of the internal combustion engine and tightened with a bolt to be assembled to the internal combustion engine.

As the internal combustion engine, an in-line four-cylinder engine of 2000 cc displacement was used, and the test was carried out under the test conditions shown in FIG. 11. After the test was completed, presence of damage in the main cylindrical surface at a portion (a site shown by Z in FIG. 6B) adjacent to the crush relief at the forward side of the semicylindrical member of each of Examples 1 and 2 and Comparative Example 1 in the rotation direction of the crank shaft was visually inspected. The result is shown in the "result" column of FIG. 12.

(Test Result)

The test result is shown in the right column of FIG. 12. Looking at the result of Comparative Example 1, the main cylindrical surface at the portion (the site shown by Z in FIG. 6B) adjacent to the crush relief at the forward side of the semicylindrical member in the rotation direction of the crank shaft comes into direct contact with the surface of the mating shaft, whereby fatigue damage in the main cylindrical surface (Al-based bearing alloy) occurred.

On the other hand, looking at the results of Example 1 and Example 2, damage did not occur in the main cylindrical surface at the portion (the site shown by Z in FIG. 6B) adjacent to the crush relief at the forward side of the semicylindrical member in the rotation direction of the crank shaft.

To be more specific, in Example 1, a trace of contact with the surface of the mating shaft was not observed in the main cylindrical surface at the portion (the site shown by Z in FIG. 6B) adjacent to the crush relief at the forward side of the semicylindrical member in the direction in which the crank shaft rotates.

Further, in Example 2, although a slight metallic luster due to a contact with the mating shaft was observed in the main cylindrical surface, that did not lead to damage. This was because since the rate of change in the sectional area of the inwardly convex curved surface was greater in Example 1, the oil film pressure of the lubricating oil that flowed in the inwardly convex curved surface part was further increased.

Note that damage was not observed in the main cylindrical surface at a portion (a site opposite to the side shown by Z in FIG. 6B) adjacent to the crush relief at the rear side of the semicylindrical member in the rotation direction of the crank shaft in either of Example 1, Example 2, and Comparative Example 1. This was because since the crush relief at the rear side in the direction in which the crank shaft rotates was in a wedge shape that becomes narrower toward the forward side in the direction in which the crank shaft rotates, even with the existing crush relief that was formed only of the outwardly convex curved surface (see FIG. 9), the oil film pressure of the lubricating oil that flowed at the circumferential end of the crush relief adjacent to the main cylindrical surface rose sufficiently due to the wedge effect.

Accordingly, unlike above described Example 1, the crush relief at the rear side of the semicylindrical member in the rotation direction of the crank shaft may be formed as a crush relief that is formed of the outwardly convex curved surface as in the past.

However, if the improved crush relief of the present invention is formed at both sides of the forward side and the rear side of the semicylindrical member in the rotation direction, when the semicylindrical member is assembled to a bearing holding part such as the connecting rod, an error in which the improved crush relief of the present invention is arranged only at the rear side in the rotation direction of the crank shaft can be advantageously prevented.

The embodiment and example of the present invention have been described in detail with reference to the drawings. However, specific configurations are not limited to the embodiment or the example, and modifications in design to such a degree that does not depart from the scope of the present invention are encompassed by the present invention.

The invention claimed is:

1. A plain bearing for supporting a crank shaft of an internal combustion engine, the plain bearing comprising:
   a pair of semicylindrical members constituting the plain bearing, each semicylindrical member including:
   two crush reliefs, each crush relief arranged in a region adjacent to a circumferential end surface of an inner circumferential surface of the semicylindrical member and gradually reducing in thickness towards the circumferential end surface, and
   a main cylindrical surface aside from the crush reliefs in the inner circumferential surface of the semicylindrical member;
   wherein in each semicylindrical member one crush relief at a forward side in a rotation direction of the crank shaft or two crush reliefs at both sides include a radially outwardly convex curved surface at a side closer to the end surface and a radially inwardly convex curved surface at a side farther from the end surface.

2. The plain bearing according to claim 1, wherein the inwardly convex curved surface is formed to approach asymptotically to the main cylindrical surface.

3. The plain bearing according to claim 1, wherein the outwardly convex curved surface is formed in a cylindrical shape, a center of the cylindrical shape being located inwardly in a radial direction of the semicylindrical member.

4. The plain bearing according to claim 1, when the plain bearing is two-dimensionally developed, wherein the main cylindrical surface is extended over a region of the crush relief to define a imaginary main cylindrical plane, wherein a sectional area of a region between the inwardly convex curved surface and the imaginary main cylindrical plane is divided into two regions by a line segment passing through a middle point of a length of the inwardly convex curved surface in the circumferential direction, wherein A1 is a sectional area of a first region farther from the end surface, and A2 is a sectional area of a second region closer to the end surface, a relationship between A1 and A2 is determined according to a formula:

$$A1/A2 < 0.3.$$

5. The plain bearing according to claim 1, wherein an overall length of the crush relief measured in the circumferential direction is 3 mm to 7 mm, and a length of the inwardly convex curved surface measured in the circumferential direction is equal to or greater than 1 mm.

6. The plain bearing according to claim 1, wherein an overall length of the crush relief measured in the circumferential direction is 3 mm to 7 mm, and a depth of the inwardly convex curved surface measured in a radial direction is 5 μm to 15 μm.

7. The plain bearing according to claim 1, wherein the plain bearing is a connecting rod bearing for supporting a crank pin of a crank shaft.

8. The plain bearing according to claim 1, wherein the plain bearing is a main bearing for supporting a journal of a crank shaft.

9. A bearing device, comprising:
   the plain bearing according to claim 1;
   a housing holding the plain bearing; and
   a crank shaft supported by the plain bearing.

* * * * *

UNITED STATES PATENT AND TRADEMARK OFFICE
CERTIFICATE OF CORRECTION

PATENT NO.       : 8,714,825 B2
APPLICATION NO.  : 13/764884
DATED            : May 6, 2014
INVENTOR(S)      : Motohiko Koushima et al.

It is certified that error appears in the above-identified patent and that said Letters Patent is hereby corrected as shown below:

In the Claims

Column 14, line 24, Claim 7, delete "hearing" and insert --bearing--.

Signed and Sealed this
Second Day of June, 2015

Michelle K. Lee
*Director of the United States Patent and Trademark Office*